United States Patent [19]

Dezael et al.

[11] 3,974,257

[45] Aug. 10, 1976

[54] PROCESS FOR REMOVING SULFUR DIOXIDE CONTAINED IN A GAS

[75] Inventors: Claude Dezael, Maisons Lafeitte; André Deschamps, Chatou; Henri Gruhier, Chatillon-sous-Bagneaux, all of France

[73] Assignee: Institut Francais du Petrole, des Carburants et Lubrifiants et Entreprise de Recherches et d'Activities Petrolieres Elf, Rueil-Malmaison, France

[22] Filed: Oct. 22, 1974

[21] Appl. No.: 516,918

[30] Foreign Application Priority Data
Oct. 22, 1973  France .............................. 73.37655

[52] U.S. Cl. .............................. 423/242; 423/356; 423/155; 423/539
[51] Int. Cl.² .......................................... C01B 17/00
[58] Field of Search ........................... 423/242–244, 423/356, 489, 490, 481, 155, 539

[56] References Cited
UNITED STATES PATENTS

| | | | |
|---|---|---|---|
| 3,226,192 | 12/1965 | Atsukawa et al. | 423/242 |
| 3,579,296 | 5/1971 | Cann | 423/242 |
| 3,792,153 | 2/1974 | Lynn et al. | 423/319 |

*Primary Examiner*—Oscar R. Vertiz
*Assistant Examiner*—Gregory A. Heller
*Attorney, Agent, or Firm*—Millen, Raptes & White

[57] ABSTRACT

A $SO_2$ containing gas, for example a stack gas, is purified according to a multi-step process, which comprises washing said gas with an aqueous ammonia solution, treating the resulting solution with hydrochloric acid, whereby $SO_2$ and an aqueous ammonium chloride solution are obtained and separated. The ammonium chloride solution is then reacted with magnesium oxide to recovery ammonia and the resulting magnesium chloride is cracked to produce hydrochloric acid and magnesium oxide, the ammonia, hydrochloric acid and magnesium oxide being recycled to the process.

6 Claims, 1 Drawing Figure

U.S. Patent  Aug. 10, 1976  3,974,257
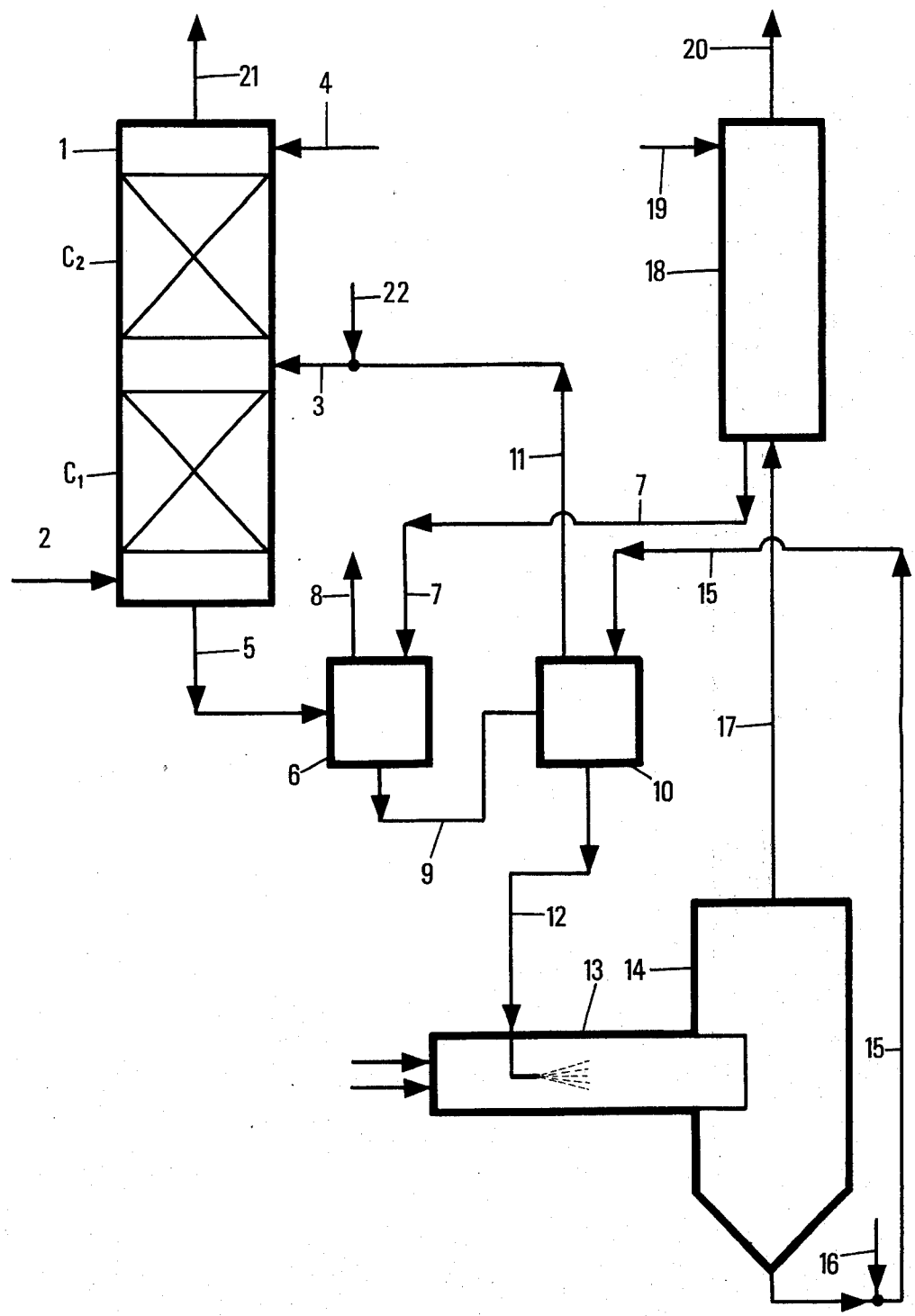

PROCESS FOR REMOVING SULFUR DIOXIDE CONTAINED IN A GAS

This invention concerns a process for removing sulfur dioxide from an industrial gas.

Combustion gases, for example those from power plants operated with fuel oil or other sulfur-containing combustible materials, or discharged from incinerators adapted to burn sulfur-containing materials, contain sulfur dioxide which contributes greatly to atmospheric pollution. Futhermore, certain chemical plants, for example those producing sulfuric acid, discharge waste $SO_2$ containing gases.

Such gases may be purified by the wet method using alkaline solutions, for example ammonia solutions which have the advantage of yielding easily regenerable solutions. It has been proposed to regenerate them by vaporization, so as to produce a $SO_2$ and $NH_3$ containing gas which may be reacted with $H_2S$, so as to produce sulfur which is discharged from the plant.

The present process yields substantially pure $SO_2$ and ammonia from sulfuric liquors, said ammonia being optionally reused in the scrubbing step.

The process comprises contacting, at a relatively low temperature, a $SO_2$ containing gas with an aqueous ammonia solution, then treating the resulting solution with hydrochloric acid, so as to release a gas containing essentially $SO_2$ and to produce an aqueous solution of ammonium chloride; contacting the latter solution with magnesium oxide so as to produce, on the one hand, a gas containing ammonia which is used to make the absorption solution, and, on the other hand, a magnesium chloride solution which is heated to a fairly high temperature, in order to recover magnesium oxide and hydrochloric acid necessary to the process.

The gas treated contains $SO_2$ as an impurity, so that the process may be used with gases of $SO_2$ content from 0.05 to 5% by volume, more usually from 0.1 to 1% by volume.

The so purified gas is practically free of $SO_2$. The residual amount thereof does not exceed 200 ppm by volume, usually 10 ppm by volume.

The process offers the advantage of providing pure $SO_2$ which may be used either as such, or for manufacturing, for example, $H_2SO_4$, or may be reduced to sulfur according to known methods. It offers the further advantage of allowing the regeneration of the absorption solution under advantageous conditions since $NH_3$ is recovered separately and the consumption of reactants is extremely small.

The process comprises several steps:

In a first step, the gas containing $SO_2$ as impurity, is contacted with an absorbing aqueous ammonia solution at a temperature usually close to its dew point, for good purification, usually about 50°C, as far as stack gas is concerned. The so treated stack gas may be freed of at least 90% of its $SO_2$ within a reasonable time. As a rule, the first step temperature is between about 30° and about 75°C. The pressure is preferably close to one atmosphere.

The resulting solution contains essentially ammonium sulfite and bisulfite. The molar ratio of $H_2O$ to $SO_2$ which characterizes this solution ($SO_2$ is present as sulfites) is, for example, from 5 to 100 and preferably from 7 to 40.

The impure gas may be washed by feeding the absorption tower with an aqueous ammonia solution, although another technique which yields excellent results consists of using a tower comprising at least 2 stages and feeding ammonia to the middle section of the tower and water to the upper section thereof.

The second step of the process comprises treating this solution with gaseous or dissolved hydrochloric acid, at a relatively low temperature, ranging usually from about 20° to about 100°C, preferably about 80°C. Under these conditions, a gas consisting essentially of $SO_2$ evolves and an aqueous ammonium chloride solution is recovered.

The reactions which take place are the following:

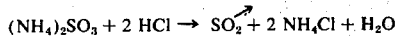

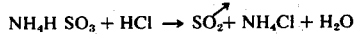

Hydrochloric acid may be used in the gaseous state of concentrations ranging from 1 to 100% by volume, preferably 10 %. It is then admixed with water. It may also be used as an aqueous solution, its concentration being from 1 N to 13 N, preferably from 2 N to 5 N. We prefer to avoid the use of such large volumes of solution, that result in excessive vaporization of the ammonium chloride solution and thus, in an expensive operation.

$SO_2$ obtained is separated and may be treated in a known manner, for example by oxidation to yield sulfuric acid or by reduction to produce sulfur.

During the third step of the process, the ammonium chloride solution of the second step is contacted with magnesium oxide, thereby producing gaseous ammonia and an aqueous solution of magnesium chloride.

The following reaction takes place :

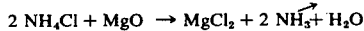

The temperature usually ranges from 20° to 150°C, more usually from 65° to 85°C and the pressure is usually from 0.2 to 5 atmospheres.

This step is carried out by adding magnesium oxide as a powder or as a suspension in water to the $NH_4Cl$ solution. An ammonia containing gas is discharged and passed to the absorption column. Additional $NH_3$ may be introduced periodically in order to compensate for the unavoidable losses which take place during the process.

The resulting solution containing magnesium chloride is used to regenerate hydrochloric acid and magnesium oxide by heating to a sufficiently high temperature. It may be, for example, introduced into a burner fed with air and fuel oil at feeding rates calculated so as to provide the desired temperature.

The operation is so conducted as to obtain a final temperature of from 180° to 1,000°C, preferably about 500°C. Under these conditions, at the burner outlet, there is obtained a mixture of powdered MgO and a vapor containing hydrochloric acid, water and the flue gases from the burner, which are passed to a gassolid separator, for example a cyclone or an electro-filter.

Magnesium oxide is recovered; it may be re-used as such or after water washing for removing magnesium chloride which impregnated it. It is then fed back to the third step reactor.

The gas phase discharged from the separator, which contains hydrochloric acid necessary to the second step, is collected. When this acid must be used as an aqueous solution, the gas phase is contacted with water, for example that which has been used to wash magnesium oxide, in a column ensuring a good gassolid contact, for example a bubble column or a packed column. The combustion gases of the burner are discharged from the upper section of this column. Alternatively, they are discharged from the plant, together with the purified gas.

EXAMPLE

This example is illustrated by the accompanying drawing.

An absorption column 1 comprising 2 stages $C_1$ and $C_2$ is fed through pipe 2 at the lower porton of the column with a flue gas from a fuel oil power plant; the gas contains 0.2% by weight of sulfur in the form of $SO_2$ and its feed rate is 1,800,000 $Nm^3$ per hour ($Nm^3$ per hour means that the volume is determined under the normal conditions of temperature and pressure). $NH_3$ is supplied from line 3 to the middle portion of the column and water from line 4 to the upper portion thereof. The gas and the ammonia solution are thus circulated in opposite directions, thereby avoiding $NH_3$ losses.

An aqueous solution of ammonium sulfite and ammonium hydrogen sulfite is discharged through line 5 from the bottom of the absorber at a hourly flow rate of 24 $m^3$. The molar compositon of the solution is such as to provide a ratio of $H_2O$ to $SO_2$ of 6.8 and a ratio of $NH_3$ to $SO_2$ of 1.33.

This solution is supplied to a reactor 6 whose temperature is maintained at about 80°C and which is fed with a hydrochloric acid solution through line 7, so as to supply 195 kmoles of hydrochloric acid per hour. The gas produced is discharged through line 8: it contains 146 kmoles of $SO_2$ per hour.

The resulting $NH_4Cl$ aqueous solution is discharged through line 9. It is fed to a stirred reactor 10 which is maintained at about 80°C and is also fed through line 15 with 97.5 kmoles of powdered MgO per hour.

Gaseous ammonia is produced and discharged through line 11 to join line 3. Additional ammonia may be charged through line 22.

The residual solution is removed from the reactor through line 12. It consists of $MgCl_2$ and water. It is supplied to a burner 13 fed with air and fuel oil and which opens in a cyclone 14. The combustion is so regulated as to provide a final temperature of about 500°C. The resulting decomposition products, HCl and MgO, are separated in the cyclone: MgO is discharged from the bottom thereof through line 15 and fed to reactor 10. Whenever additional MgO is required, it is supplied through line 16.

Hydrochloric acid is discharged through line 17 and passed to a washing column 18 fed at the top with water through line 19, so as to yield the solution supplied to reactor 6 through line 7. The combustion gases which have not been retained by water escape through line 20. The purified gas is discharged from the plant through stack 21, at the top of the absorption column 1.

What we claim is:

1. A process for removing sulfur dioxide contained in a gas as an impurity comprising (1) contacting said gas with an aqueous ammonia solution to absorb sulfur dioxide in the form of ammonium sulfites, (2) reacting the resulting solution with hydrochloric acid to obtain a $SO_2$ containing gas and an aqueous ammonium chloride solution, and separating the $SO_2$ containing gas from the aqueous ammonium chloride solution and (3) reacting the ammonium chloride solution with magnesium oxide, so as to produce an ammonia-containing gas, and an aqueous magnesium chloride solution; heating said aqueous magnesium chloride solution to a sufficiently high temperature to produce magnesium oxide and hydrochloric acid, and employing said ammonia-containing gas, and the hydrochloric acid and magnesium oxide from step (3) in steps (1), (2) and (3), respectively.

2. A process according to claim 1, wherein the reaction with hydrochloric acid is carried out at a temperature of from 20° to 100°C.

3. A process according to claim 1, wherein the reaction with magnesium oxide is carried out at a temperature of from 20° to 150°C and at a pressure of from 0.2 to 5 atmospheres.

4. A process according to claim 1, wherein the decomposition of magnesium chloride is carried out by heating at 180°–1,000°C.

5. A process according to claim 1 wherein the impurity content of $SO_2$ is 0.05 to 5% by volume, and the residual $SO_2$ in resultant purified gas is not more than 200 ppm by volume.

6. A process according to claim 3 wherein said temperature of magnesium oxide reaction is 65°–85°C.

* * * * *

UNITED STATES PATENT AND TRADEMARK OFFICE
CERTIFICATE OF CORRECTION

PATENT NO. : 3,974,257
DATED : August 10, 1976
INVENTOR(S) : DEZAEL ET AL.

It is certified that error appears in the above-identified patent and that said Letters Patent are hereby corrected as shown below:

[73] should read --

Assignee: INSTITUT FRANCAIS DU PETROLE

FRANCE  RUEIL-MALMAISON --.

Signed and Sealed this

Twenty-eighth Day of December 1976

[SEAL]

Attest:

RUTH C. MASON
*Attesting Officer*

C. MARSHALL DANN
*Commissioner of Patents and Trademarks*